(12) United States Patent
Johnson et al.

(10) Patent No.: US 7,364,031 B1
(45) Date of Patent: Apr. 29, 2008

(54) SPLIT SPIN BAR FOR USE WITH PLASTIC LID HANDLING SYSTEM

(75) Inventors: Darrell B. Johnson, Fort Collins, CO (US); Dale G. Friesen, Fort Collins, CO (US)

(73) Assignee: CBW Automation, Inc., Fort Collins, CO (US)

( * ) Notice: Subject to any disclaimer, the term of this patent is extended or adjusted under 35 U.S.C. 154(b) by 0 days.

(21) Appl. No.: 11/820,248

(22) Filed: Jun. 18, 2007

(51) Int. Cl.
*B65G 47/28* (2006.01)

(52) U.S. Cl. ............................... 198/459.8; 198/459.3; 198/624; 198/419.2

(58) Field of Classification Search ............. 198/462.1, 198/459.3, 461.2, 459.8, 608, 623, 624, 419.2, 198/663, 817; 414/797.3, 797.7, 798.9
See application file for complete search history.

(56) References Cited

U.S. PATENT DOCUMENTS

| | | | | |
|---|---|---|---|---|
| 3,503,486 A | * | 3/1970 | Alexander et al. | 198/462.1 |
| 3,538,992 A | * | 11/1970 | Chauhan | 198/817 |
| 3,827,582 A | * | 8/1974 | Lederer | 414/798.5 |
| 4,391,560 A | * | 7/1983 | Fardin | 198/462.1 |
| 4,435,114 A | * | 3/1984 | Fardin | 198/461.2 |
| 4,711,338 A | * | 12/1987 | Carson et al. | 198/817 |
| 4,795,022 A | * | 1/1989 | Simmons | 198/817 |
| 5,005,340 A | * | 4/1991 | Mojden | 414/798.5 |
| 5,472,076 A | * | 12/1995 | Sommer | 198/663 |
| 5,957,655 A | * | 9/1999 | Gomez | 414/798.9 |

\* cited by examiner

*Primary Examiner*—James R. Bidwell
(74) *Attorney, Agent, or Firm*—William E. Hein

(57) ABSTRACT

An apparatus for handling horizontally oriented flat circular articles, such as plastic lids, employs a pair of parallel rotating spin bars, one of which is divided or split into a shorter lid entry section and a longer lid discharge section. The shorter lid entry section rotates at the same speed as the other one of the parallel spin bars to stabilize the lids as they sequentially drop off a waterfall conveyor and become vertically on-edge oriented, while the longer discharge section of the split spin bar rotates at a different speed to promote lateral movement of the vertically oriented lids along the spin bars into a stack at the discharge end of the rotating spin bars.

7 Claims, 2 Drawing Sheets

SPLIT SPIN BAR FOR USE WITH PLASTIC LID HANDLING SYSTEM

BACKGROUND AND SUMMARY OF THE INVENTION

This invention relates generally to apparatus for handling generally flat circular articles, such as plastic lids and, more particularly, to a spin bar for use therein having two sections, each of which rotates at a different speed.

Plastic lid handling systems are known in the prior art, representative of which are those described in U.S. Pat. Nos. 5,863,177; 6,547,057; and 6,662,928. In such systems, plastic lids move along a conveyor in a single file, horizontally oriented. The conveyor terminates in a waterfall section, over which the lids sequentially drop in order to reorient them to a vertical on-edge position. They drop onto a pair of parallel cylindrical bars, rotating at the same speed, to maintain the vertical orientation of the lids. The rotating cylindrical bars, known as spin bars, are longitudinally angled slightly downwardly to facilitate collection of the lids in a stack at the discharge end of the spin bars. It has been discovered that rotation of both spin bars at the same speed, in accordance with these prior art lid handling system, impedes travel of the vertically oriented lids along the length of the spin bars.

It would therefore be advantageous to provide a lid handling system that stabilizes the lids as they drop off the waterfall end of the conveyor to become vertically oriented and that then promotes lateral movement of the vertically oriented lids into a stack for collection.

In accordance with the illustrated preferred embodiment of the present invention, one of a pair of parallel rotating spin bars is split into a shorter lid entry section and a longer lid discharge section. The shorter lid entry section rotates at the same speed as the other one of the parallel spin bars to stabilize the lids as they drop off the waterfall end of the conveyor to become vertically on-edge oriented, while the longer discharge section of the split spin bar rotates at a different speed to promote lateral movement of the vertically oriented lids along the spin bars into a stack at the discharge end thereof.

DESCRIPTION OF THE PREFERRED EMBODIMENT

Figure 1:
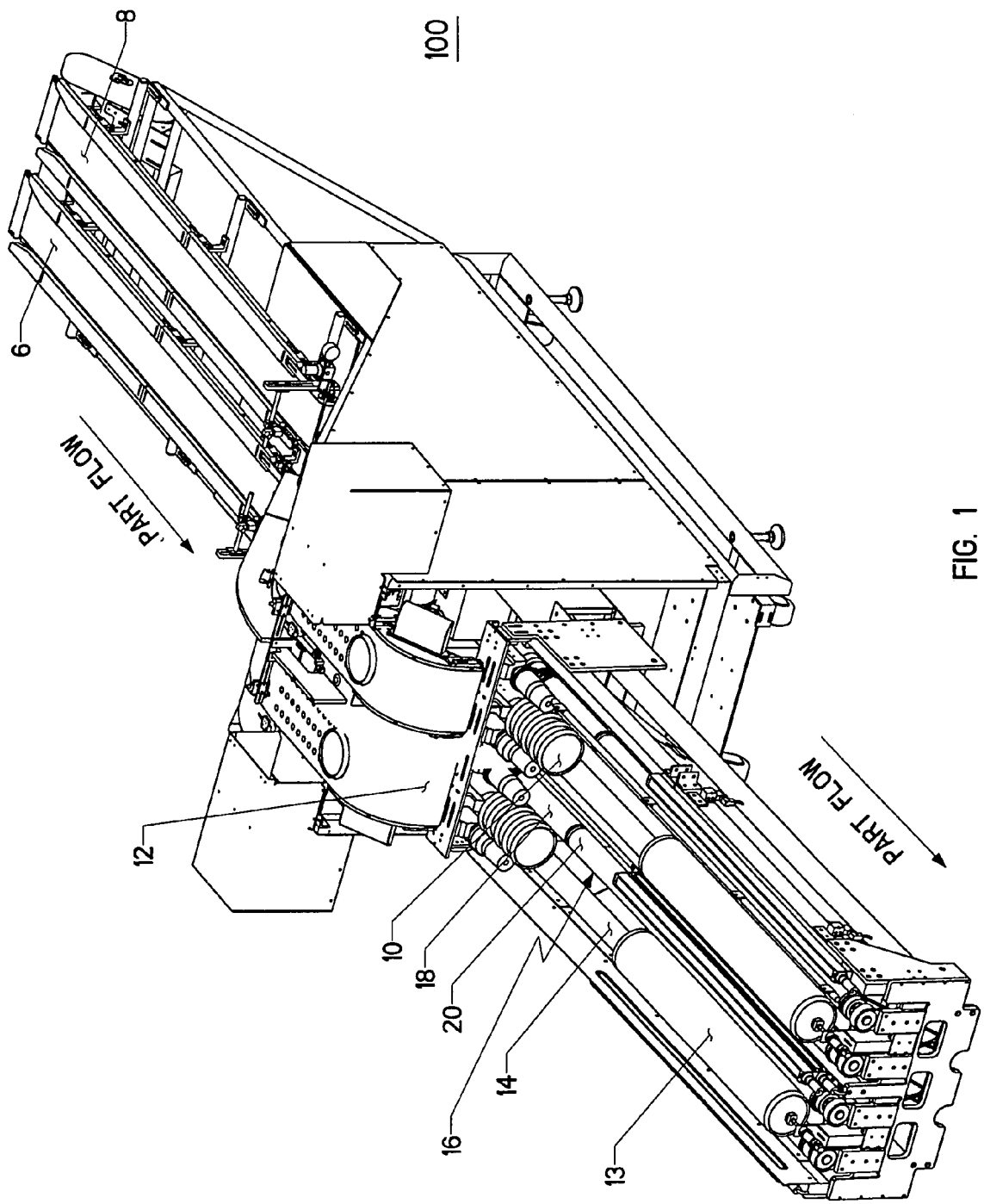
FIG. 1 is a pictorial diagram of a dual-lane lid handling system employing a split spin bar in each conveyor lane, in accordance with the present invention.

Referring now to FIG. 1, there is shown a dual-lane lid handling system 100 having parallel conveyor lanes 6, 8 for conveying a multiplicity of lids 10 which drop off a waterfall conveyor 12 of each lane onto two parallel rotating spin bars 14, 16. Spin bars 14, 16 are angled slightly downwardly toward the discharge end thereof to facilitate the travel of lids 10 along the length of spin bars 14, 16 for accumulation in the form of a stack 13 of vertically oriented lids 10. Each accumulated stack 13 of vertically oriented lids 10 is then conventionally handled as desired for further processing.

Figure 2:
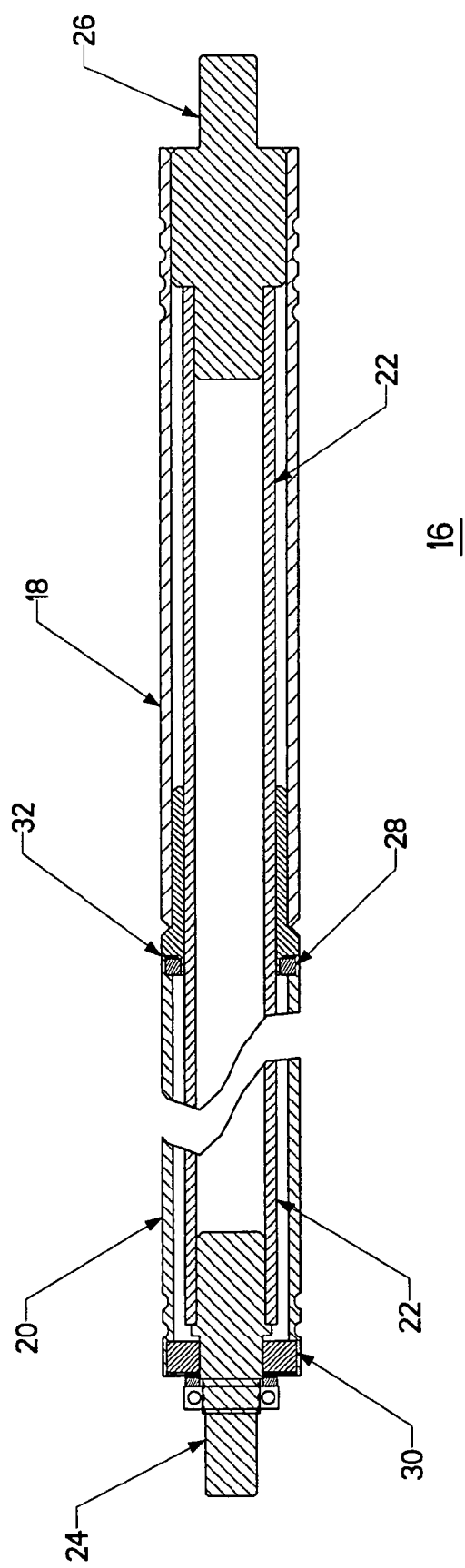
FIG. 2 is a cross-sectional diagram of the split spin bar employed in each of the conveyor lanes of the lid handling system of FIG. 1.

Spin bar 14 is preferably a single piece tubular spin bar, while spin bar 16 is split into a shorter lid entry tubular section 18 and a longer lid discharge tubular section 20, having equal outer diameters, as illustrated in detail in FIG. 2. Spin bar 16 includes a central tubular shaft 22, terminating in solid end shafts 24, 26 that are conventionally mounted on bearings for rotation. The shorter lid entry tubular section 18 of spin bar 16 is welded or otherwise fixedly attached concentrically over end shaft 26. The longer lid discharge tubular section 20 of spin bar 16 is spaced concentrically outwardly from central shaft 22 by means of an inner bearing 28 and an outer bearing 30, both of which are mounted on central shaft 22. A short length at an inner end of lid discharge section 20 of spin bar 16 is of reduced diameter so as to telescope inside an outer end of lid entry section 18 of spin bar 16 to thereby form a outside surface juncture 32 between lid entry section 18 and lid discharge section 20 of spin bar 16.

In operation, spin bar 14 and lid entry section 18 of spin bar 16 are rotationally driven at equal speeds to stabilize lids 10 as they drop off waterfall conveyor 12 and become vertically oriented. Lid discharge section 20 of spin bar 16 is conventionally driven by bearing 30 at a speed that differs from that of spin bar 14 and lid entry section 18 of spin bar 16 to promote movement of the lids 10 longitudinally along spin bars 14, 16 in order to form the collected stack 13 of lids 10. The rotational speed differential between spin bar 14 and lid discharge section 20 of spin bar 16 is determined at the time of machine set-up as a function of the design characteristics of the lids being handled. That is, different lid designs may require that lid discharge section 20 of spin bar 16 rotate slower or faster than spin bar 14 and at varying speed differentials therebetween. The spin bars 14, 16 are belt driven by conventional variable frequency motors. One motor drives spin bar 14, while lid entry section 18 of spin bar 16 is belt-slaved off of spin bar 14. A second variable speed motor drives lid discharge section 20 of spin bar 16. By using two motors and different size pulleys, the speed of lid discharge section 20 of spin bar 16, relative to that of spin bar 14 and lid entry section 18 of spin bar 16, may be easily adjusted during machine set-up.

It should be understood that the above-described details of operation of spin bars 14, 16 associated with conveyor lane 6 apply as well to parallel conveyor lane 8 or additional conveyor lanes that may be added to lid handling system 100.

We claim:

1. An apparatus for collecting a multiplicity of like circular articles having a generally flat cross section, such as lids, the apparatus comprising:
   a pair of rotating spin bars generally equal in length, mounted parallel to each other, and angled downwardly from an article entry end thereof to an article discharge end thereof, a first one of said pair of rotating spin bars being rotated at a first selected speed, a second one of said pair of rotating spin bars having an article entry section being rotated at said first selected speed of said first one of said pair of rotating spin bars and having a longer article discharge section being rotated at a second selected speed that is different from said first selected speed of both said first one of said pair of rotating spin bars and said article entry section of said second one of said pair of rotating spin bars; and
   means for sequentially conveying said multiplicity of circular articles onto the pair of rotating spin bars, said circular articles being conveyed onto the pair of rotating spin bars in vertical on-edge orientation.

2. An apparatus as in claim 1, wherein:
said first selected speed at which said first one of said pair of rotating spin bars and said article entry section of said second one of said pair of rotating spin bars are rotated is chosen to stabilize said articles as they are being conveyed onto said pair of rotating spin bars; and
said second selected speed at which said article discharge section of said second one of said pair of rotating spin bars is being rotated is selected to promote movement of said multiplicity of articles conveyed onto said pair of rotating spin bars longitudinally along said pair of rotating spin bars to form an on-edge stack of said articles at said discharge end of said pair of rotating spin bars.

3. An apparatus as in claim 1, wherein said means for sequentially conveying said multiplicity of circular articles onto said pair of rotating spin bars in vertical on-edge orientation comprises a waterfall conveyor from which each one of said multiplicity of circular articles gravitationally falls.

4. An apparatus as in claim 1, wherein an outer diameter of said first one of said pair of rotating spin bars is equal to an outer diameter of each of said article entry and article discharge sections of said second one of said pair of rotating spin bars.

5. An apparatus as in claim 1, wherein said second one of said pair of rotating spin bars comprises:
a central tubular shaft terminating in solid end shafts at article entry and article discharge ends thereof, each of said end shafts being mounted for rotation;
a tubular article entry section fixedly attached concentrically over said end shaft at said article entry end of said central tubular shaft; and
a tubular article discharge section longer than a length of said tubular article entry section, said tubular article discharge section being spaced concentrically outwardly from said central tubular shaft by means of an inner bearing positioned proximate an inner end of said tubular article discharge section and an outer bearing positioned proximate an outer end of said tubular article discharge section.

6. An apparatus as in claim 5, wherein an inner end of said tubular article discharge section is of reduced diameter for telescoping inside an outer end of said article entry section to thereby form a outside surface juncture between said article entry section and said article discharge section of said second one of said pair of rotating spin bars.

7. An apparatus as in claim 1, wherein said circular articles comprise plastic lids.

* * * * *